United States Patent [19]
Krishnamurthy et al.

[11] Patent Number: 5,469,188
[45] Date of Patent: Nov. 21, 1995

[54] PRE-ANALYSIS OF VIDEO SIGNALS OBTAINED FROM DIGITAL IMAGES

[75] Inventors: Suresh Krishnamurthy, Bangalor, Ind.; Robert A. McCormick, Beaverton, Oreg.; Kenneth F. Cone, Portland, Oreg.; Gary L. Brown, Lake Oswego, Oreg.; Ronald W. Bryant, Mt. Angel, Oreg.

[73] Assignee: Tektronix, Inc., Wilsonville, Oreg.

[21] Appl. No.: 874,447

[22] Filed: Apr. 27, 1992

[51] Int. Cl.$^6$ .................................................. G09G 5/00
[52] U.S. Cl. ........................................... 345/117; 345/153
[58] Field of Search ................................... 340/701, 703, 340/715, 720, 721, 723; 324/121 R; 358/105, 108, 318, 324, 213.15, 213.17; 345/117, 153

[56] References Cited

U.S. PATENT DOCUMENTS

| | | | |
|---|---|---|---|
| 4,257,063 | 3/1981 | Loughry et al. | 340/715 |
| 4,775,857 | 10/1988 | Staggs | 340/715 |
| 4,901,009 | 2/1990 | Schultze et al. | 324/121 R |

*Primary Examiner*—Richard Hjerpe
*Attorney, Agent, or Firm*—Francis I. Gray

[57] ABSTRACT

A method of pre-analyzing video signals obtained from a digital image stores the digital image in a frame buffer store in a specified video digital format. The amplitude, saturation and frequency of the stored digital image when converted into another video format, such as RGB or composite broadcast video, are each analyzed independently to identify areas of the stored digital image that might produce distortions in the final video format when displayed. Amplitude analysis is accomplished by converting the stored digital image into an RGB image, and each component is compared with predetermined limits to detect amplitude errors. Saturation analysis is accomplished by generating a saturation signal from the chrominance components of the stored digital image, and then comparing a function of the saturation signal with predetermined limits to detect oversaturation errors. Frequency analysis is accomplished by appropriately filtering each component of the stored digital image to pass only frequencies for that component that are not allowed in the target video format, and then detecting the occurrence of significant frequency values outside the filter frequency range as frequency errors. A display of the stored digital image, of appropriate waveforms related to the selected analysis function, and of discrete count values provides information to allow for interaction with an operator.

8 Claims, 3 Drawing Sheets

PRE-ANALYSIS OF VIDEO SIGNALS OBTAINED FROM DIGITAL IMAGES

BACKGROUND OF THE INVENTION

The present invention relates to computer animation, and more particularly to pre-analysis of video signals obtained from digital images produced from the computer animation process to assure that the digital images will produce video signals compatible with video broadcast standards.

In computer animation for the television industry an artist generally works with a computer workstation in the red, green and blue (RGB) domain. The workstation display is in the form of a non-interlaced bit-map. Each "bit" in the map represents a picture element (pixel), and for RGB is commonly a 24-bit digital word, eight bits for each color component. Thus the range of values is from zero to 255 for each component. Because the resulting image is digital, there can be sharp transitions between color levels. A sequence of these images may be stored in a computer file as an animation sequence.

Alternatively the artist may work in a digital component domain where each pixel of the image is described in terms of a luminance component Y (brightness) and two chrominance components Cr, Cb. Again due to the digital nature of the signal there may be sharp transitions between colors in the image. Also it can be shown that there are combinations of values for Y,Cr,Cb that produce colors which are not reproducible in the RGB domain. So transformation from one color domain to another may result in invalid colors in the target color domain.

In the digital component domain the luminance Y is defined as percentages of the RGB components. For example:

$$Y = 0.299R + 0.587G + 0.114B.$$

Each chrominance component is then defined as a function of R-Y (Cr) and B-Y (Cb). For broadcast applications this digital component video is then converted into a composite signal where one color component modulates a color subcarrier signal, the other color component modulates a quadrature version of the color subcarrier signal, and the two modulated signals are added together. To this composite chrominance signal is added the luminance signal. Because of limitations in bandwidth imposed by the broadcast television standards, the sharp transitions in color or luminance may cause ringing in the composite video monitors or video receivers which produces objectionable "ghosting" in the image. Since the audio portion of the broadcast signal is frequency modulated against the video portion, if the luminance and chrominance components go too high, the AM portion of the signal goes to zero, resulting in buzz or other audio effects. Also where textures in the image vary at frequencies close to the subcarrier frequency, the video monitor/receiver is confused into interpreting luminance information as chrominance information, producing an erroneous color display—a "rainbow" effect.

The artist produces the animation sequence and generally provides it to a broadcast station or post-production studio in a digital component video format. When this digital component video animation sequence is encoded into a broadcast video signal, the above problems may appear for the first time. This is either too late to change the animation sequence, or will require an extensive amount of time by the artist to correct the animation sequence in order to avoid the distortions.

What is desired is a pre-analysis of video signals obtained from a digital image that provides an artist in the preparation of animation sequences with an indication of color distortion errors so that the artist can correct such errors interactively during the animation process.

SUMMARY OF THE INVENTION

Accordingly the present invention provides a pre-analysis of video signals obtained from digital images to identify regions of the digital images that would produce color distortions when encoded as a broadcast television signal. A digital image is loaded into a frame buffer store, either from a computer workstation or from a video recorder, in a digital component format. At an operator's selection the digital image is checked for amplitude, saturation or frequency errors. The errors are compiled and suitably displayed on the workstation display. Amplitude errors are determined by converting each pixel of the digital image into an equivalent RGB pixel. If the amplitude of any of the RGB components falls outside predetermined tolerances, an amplitude error is flagged. For saturation errors a saturation value based on luminance and absolute saturation for each pixel of the digital image is compared to an IRE standard level. Pixel saturation values above the standard level are flagged as saturation errors. Finally the frequency of each digital component of the digital image is examined for frequency errors. A high pass filter is used to pass only out of band frequencies. Those out of band frequencies that exceed a threshold limit are flagged as frequency errors.

The objects, advantages and other novel features of the present invention are apparent from the following detailed description when read in conjunction with the attached claims and appended drawing.

DESCRIPTION OF THE PREFERRED EMBODIMENT

Figure 1:
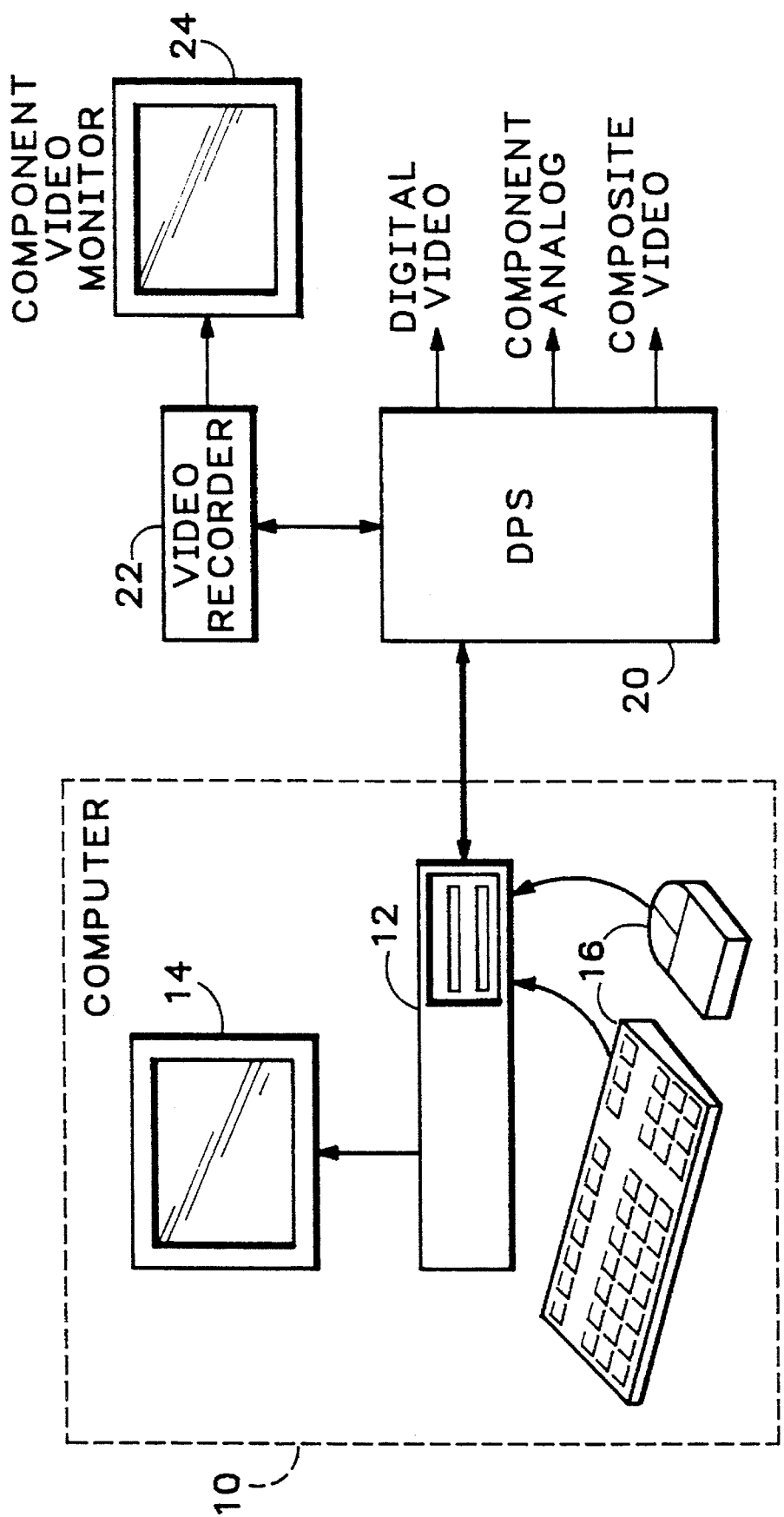
FIG. 1 is a block diagram view of a system for performing pre-analysis of video signals obtained from digital images according to the present invention.

Referring now to FIG. 1 a computer system or workstation 10 has a central processor 12, a display 14 and an interface 16, such as a conventional keyboard and mouse. Coupled to the computer system 20 is a digital processing system (DPS) 20 that includes at least one frame buffer store. Also coupled to the DPS 20 is a video recorder 22 together with an associated component video monitor 24. An artist may create an image as part of an animation sequence on the computer system 10 in the RGB domain. The RGB image is stored in a computer file. For pre-analysis the RGB image is converted into the digital component domain and stored in the frame buffer store of the DSP 20. Alternatively the digital component domain image may be stored on the video recorder 22 and viewed on the component video monitor 24, and/or subsequently ported into the frame buffer store of another computer system 10. The frame buffer store contains one full frame (two video fields in a non-interlaced format) of the digital component image. The digital component image may then be encoded into a desired video format, such as component analog or composite broadcast format, for subsequent transmission, processing and/or display on an appropriate video monitor/receiver.

Figure 2:
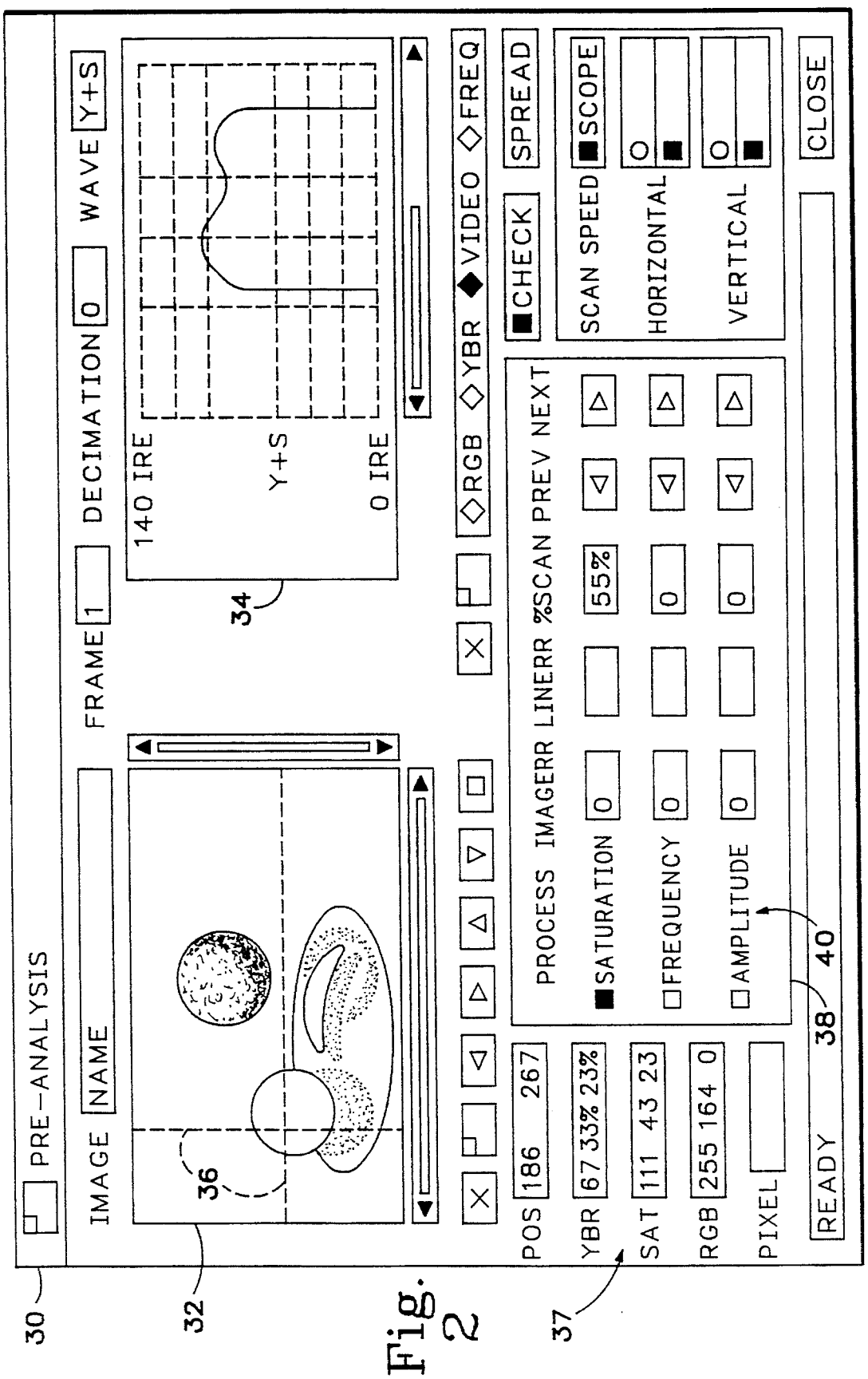
FIG. 2 is a plan view of a control/display panel for the pre-analysis of video signals according to the present invention.

To perform pre-analysis of video signals for a digital image an artist first accesses an image file in the computer system 10 and loads it into the frame buffer store of the DSP 20. The artist then selects one of several pre-analysis functions to analyze the image in the frame buffer store to determine whether, when encoded into a broadcast video format, there are possible color distortions according to the selected function. The selection of the pre-analysis function produces a panel display 30 on the computer system display 14, such as the one shown in FIG. 2.

The image in the frame buffer store may be displayed in a display window 32 of the panel display 30, and a selected corresponding waveform may be shown in a waveform window 34. Shown on the image window 32 is a cursor 36 that identifies a particular line and pixel on the line. Below the display windows 32, 34 are status windows 37 that indicate the (X,Y) pixel location (POS) of the cursor 36 with respect to the image origin, the digital component values (YBR) of that pixel where Y is an IRE value between zero and 100 and the chrominance components are percentages between −50% and 50%, the saturation (SAT) value of the pixel in IRE units, the RGB values of the pixel between zero and 255 (8-bit values), and a color swatch (PIXEL) of the pixel including the immediately preceding and following pixels on the same horizontal line. Centrally under the display windows 32, 34 is a pre-analysis control area 38 that includes selection controls 40 to perform saturation, frequency and amplitude analyses of the image in the image window 32. The errors, both for the total image and each line, are displayed in respective windows for each test. Also the percent of scan of the image is also disclosed. Once a scan of the image is completed for a selected test, a NEXT or PREV button moves the cursor 36 to the next or previous pixel that exhibited an error of the selected type.

Figure 3:
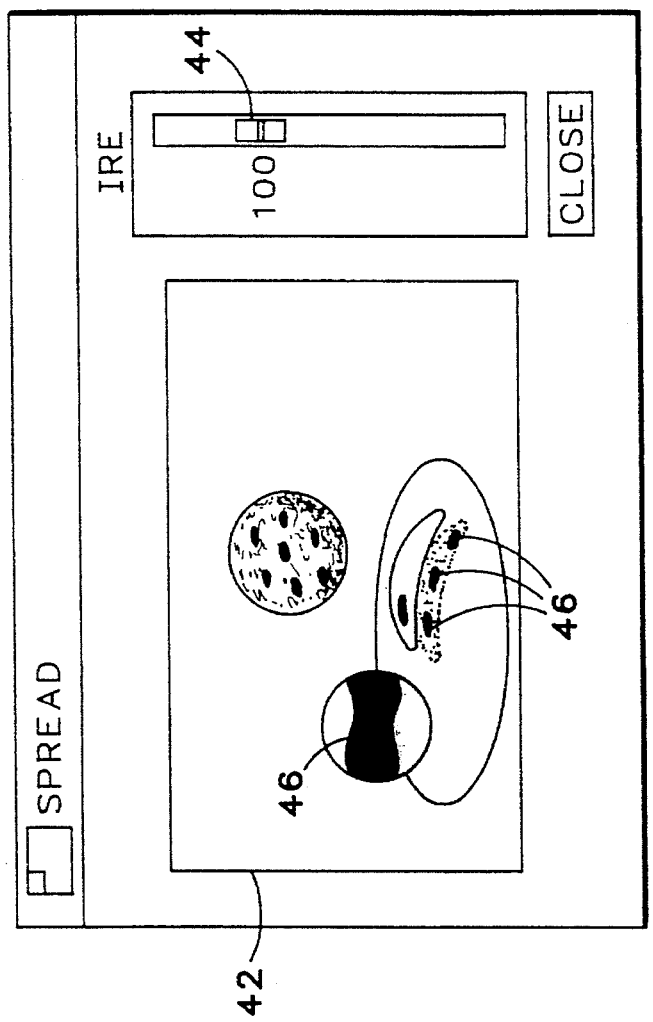
FIG. 3 is a plan view of a special display panel according to the present invention.

Another type of display for showing errors is shown in FIG. 3. In this display an error image window 42 is shown with the image in grey scale. At the right is a lever 44 for adjusting a level between zero and 140 IRE. For all values of pixels that exceed the IRE level set by the lever 44, a selected color, such as magenta, is displayed in the error image window as a modulation of the portions 46 of the image that exceed the level. In this manner errors may be seen pictorially while retaining reference to the image luminance cues.

To perform an amplitude check an artist selects the amplitude module from the pre-analysis panel 30. The amplitude module checks for signal errors generated when the image file previously has been converted from RGB to digital component or captured as such. When the amplitude module is initiated by a CHECK command, the image is scanned. As the image is scanned the amplitude module converts the digital component back to the RGB domain pixel by pixel. Then each component for each pixel in the RGB domain is checked to determine whether the value is within predetermined limits. For an 8-bit digital word per component, the value range is between zero and 255, which is normalized to be between zero and one. If the conversion back to the RGB domain from the digital component domain results in overflow or underflow, either greater than one or less than zero normalized, then an amplitude error is detected for that pixel. The location of the pixel is flagged, the resulting RGB values are displayed, and error line and image counters are incremented, with the error line counter being reset after each video line, the count for the line being stored. At the conclusion of the scan of the image, the pixels may be visually pinpointed to the artist by using the NEXT and PREV commands. Also the contents of the counters are displayed, so the total numbers of errors per image or line indicated by the cursor may be determined. An automatic comparison may also be made to automatically set an alarm for the image if the number of errors exceeds a threshold limit. In addition the error detection may be made tolerant to normal encoding variations due to bandpass limiting of data in the digital domain by applying an RMS averaging filter, or similar lowpass filter, to the error signal prior to the threshold limit check.

The saturation module checks the digital component image for Y+S, SAT and Y−S values. Saturation (S) is defined as the square root of the sum of the squares of the chrominance components Cr, Cb. For example in the NTSC television standard the chrominance components are I and Q so that $S=\mathrm{sqrt}(I^2+Q^2)$. The artist selects the saturation module and initiates the scanning by executing the CHECK command. Again the image in the frame buffer store is scanned and chrominance components of adjacent pixels are combined to produce the saturation values for each pixel. The saturation values are added and subtracted to the corresponding luminance values to produce the Y+S and Y−S values. The saturation and Y+S values are measured between zero and 140 IRE, with values over 120 and under −20 IRE typically being flagged as errors, while Y−S is measured on an IRE scale between −40 to 100 IRE units. Again the out of limits pixels are flagged, the errors are counted and the results are displayed.

Figure 4:
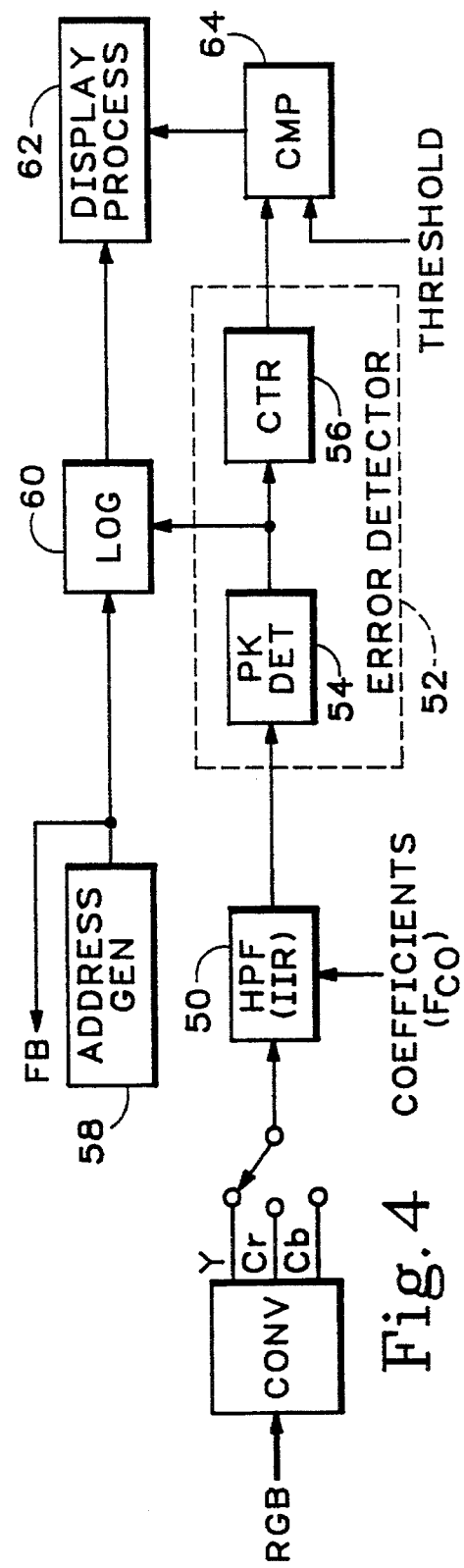
FIG. 4 is a block diagram view of a frequency analysis module according to the present invention.

Referring now to FIG. 4 the frequency module checks the digital component image for conformance with broadcast (NTSC or PAL) standards for signal frequency. This module checks for sharp transitions that may cause ringing in receiver filters which in turn results in "ghosts". Each of the component signals that make up the image are processed in turn. The particular component being processed is input to a high pass filter 50, the cutoff frequency of which is determined by the particular component being processed. For example the cutoff frequency may be 4.2 MHz for the luminance component, but 1.6 MHz for the chrominance components. One way of implementing this high pass filter is with an Infinite Impulse Response (IIR) digital filter using appropriate coefficients for the desired cutoff frequency, as is well known in the art. Those transitions that are not too sharp will not pass through the filter, while sharp transitions will produce frequency components above the cutoff frequency of the filter. The output of the filter 50 is input to an error detector 52 that includes a peak detector 54 and a counter 56 in series. If the peak detector senses a local maximum from the filter 50 that exceeds a noise threshold, then a signal is passed to the counter 54 to be accumulated. The counter counts errors for both each line and the image. Also the samples from the filter 50 may be input to a root-mean-square circuit to provide another measure of potential encoding problems if the result is above a discrimination level.

An address generator 58 that provides the readout addresses to the frame buffer store also provides an input to a logging circuit 60. When a local maximum is detected by the peak detector 54, the address is stored as a pointer to the pixel to identify the approximate location in the image of the potential problem. The logging circuit 60 is coupled to a display processor 62 for providing the error display. Also the output of the counter 56 may be input to a comparator 64 to compare the error count with a threshold value. The output of the comparator also is provided to the display processor.

The filtering and discrimination technique of FIG. 4 may also be applied vertically, diagonally or two-dimensionally in time to determine the potential for the generation of flicker between frames, dot crawl or subcarrier aliasing artifacts. To address the problem of color distortion caused by certain textures in the luminance component of the image, a bandpass filter may also be used in conjunction with the highpass filter 50 to identify these types of problem areas in the image. This problem may occur due to closely spaced diagonal lines, or when the image is compressed during the animation sequence, as is well known in the art.

The display panel of FIG. 3 is useful for displaying oversaturation errors. This display panel shows Y+S saturation values of the image as a function of a sliding threshold of IRE units. Violations above the set threshold level, as indicated by the slider to the right of the image display, are displayed in a specified hue, such as magenta modulated with the image luminance, while the rest of the image is displayed in uncolored grey scale.

Thus the present invention provides a pre-analysis of a video image obtained from a digital image by selecting one test from a number of analysis functions, scanning the digital image to provide input to the selected function, examining the input according to the function parameters, and accumulating errors for display when the input falls outside the parameters, all on an interactive basis.

What is claimed is:

1. A method of pre-analyzing video signals obtained from a digital image to be displayed to identify potential distortion areas in the displayed digital image when the video signals are encoded and decoded comprising the steps of:

storing the digital image in a specified digital video format in a frame buffer store;

scanning the stored digital image to produce a video signal;

analyzing the video signal according to parameters determined by a selected one from a plurality of analysis functions to generate an error signal; and displaying the error signal.

2. The method of claim 1 wherein the storing step comprises the step of:

converting a digital image from a computer file into a frame of the specified digital video format; and inputting the frame into the frame buffer store.

3. The method of claim 1 wherein the analyzing step comprises the steps of:

converting the stored digital image into a digital image in the RGB color domain; and comparing each component of the RGB digital image with predetermined level values to generate the error signal when the component values are outside the predetermined level values.

4. The method of claim 1 wherein the analyzing step comprises the steps of:

computing a saturation signal for the stored digital image; and comparing a function of the saturation signal with predetermined level values to generate the error signal when the saturation signal is outside the predetermined level values.

5. The method of claim 1 wherein the analyzing step comprises the steps of:

filtering the stored digital image to exclude valid frequencies for the video signals when encoded; and detecting the error signal when the filtered stored digital image produces values above a predetermined noise level.

6. The method of claim 1 wherein the displaying step comprises the steps of:

counting events in the error signal for the entire stored digital image; and providing for display the total count for the entire stored digital image.

7. The method of claim 1 wherein the displaying step comprises the steps of:

counting events in the error signal for each line of the stored digital image; and providing for display the total count for each line of the stored digital image.

8. The method of claim 7 wherein the displaying step further comprises the steps of:

generating a waveform representing the error signal for each line; and displaying the waveform together with parameters of the selected function to provide a visual indicia of distortion areas.

\* \* \* \* \*